(12) United States Patent
Cote et al.

(10) Patent No.: US 10,187,318 B2
(45) Date of Patent: Jan. 22, 2019

(54) DYNAMIC BANDWIDTH CONTROL SYSTEMS AND METHODS IN SOFTWARE DEFINED NETWORKING

(71) Applicant: Ciena Corporation, Hanover, MD (US)

(72) Inventors: David Cote, Gatineau (CA); William Webb, Decatur, GA (US); Sergio Slobodrian, Richmond (CA)

(73) Assignee: Ciena Corporation, Hanover, MD (US)

( * ) Notice: Subject to any disclaimer, the term of this patent is extended or adjusted under 35 U.S.C. 154(b) by 290 days.

(21) Appl. No.: 14/691,667

(22) Filed: Apr. 21, 2015

(65) Prior Publication Data

US 2016/0315830 A1    Oct. 27, 2016

(51) Int. Cl.

| | |
|---|---|
| *G06F 15/177* | (2006.01) |
| *H04L 12/873* | (2013.01) |
| *H04L 12/24* | (2006.01) |
| *H04L 12/801* | (2013.01) |
| *H04L 12/26* | (2006.01) |
| *H04L 12/851* | (2013.01) |

(52) U.S. Cl.
CPC .......... *H04L 47/52* (2013.01); *H04L 41/5041* (2013.01); *H04L 47/127* (2013.01); *H04L 43/02* (2013.01); *H04L 43/04* (2013.01); *H04L 47/2441* (2013.01)

(58) Field of Classification Search
CPC ............. H04L 41/5041; H04L 41/5051; H04L 41/0896; H04L 43/02; H04L 45/38; H04L 45/125; H04L 45/30; H04L 45/02; H04L 47/52; H04L 47/12; H04L 47/805; H04L 47/10; H04L 43/30; H04L 43/0876; H04L 41/0816; H04L 41/0843; H04L 41/145; H04L 41/5009; H04L 41/5038; H04L 43/062; H04L 45/302; H04L 47/22; H04L 47/127; H04L 47/2441; H04L 43/04
USPC ........ 709/213, 217, 224; 370/230, 389, 232, 370/412, 235, 236; 398/45
See application file for complete search history.

(56) References Cited

U.S. PATENT DOCUMENTS

| | | |
|---|---|---|
| 9,438,370 B2 * | 9/2016 | Swinkels ............ H04J 14/0227 |
| 2008/0273591 A1 | 11/2008 | Brooks et al. |
| 2012/0224857 A1 | 9/2012 | Su et al. |

(Continued)

FOREIGN PATENT DOCUMENTS

CN    103841044 A    6/2014

*Primary Examiner* — Jungwon Chang
(74) *Attorney, Agent, or Firm* — Clements Bernard Walker PLLC; Christopher L. Bernard; Lawrence A. Baratta, Jr.

(57) ABSTRACT

A bandwidth control method implemented in a Software Defined Networking (SDN) network includes obtaining data for one or more services in the network, wherein each of the one or more services is controlled by an associated user-agent; determining future bandwidth requirements for the one or more services based on the data; determining service requests for at least one of the one or more services based on the future bandwidth requirements; and causing implementation of at least one of the service requests in order of priority. The process of prioritization uses a programmable network-wide logic and has the ability to consider information external to the network such as a user's Service Layer Agreement (SLA) and business priority. The entire bandwidth control method can repeat in cycles providing near real-time adjustments.

17 Claims, 13 Drawing Sheets

(56) References Cited

U.S. PATENT DOCUMENTS

| | | | |
|---|---|---|---|
| 2013/0039182 A1* | 2/2013 | Das | H04L 41/0816 370/235 |
| 2014/0199067 A1 | 7/2014 | Ahuja et al. | |
| 2014/0301192 A1 | 10/2014 | Lee et al. | |
| 2014/0355436 A1* | 12/2014 | Zhang | H04L 47/10 370/232 |
| 2015/0003448 A1 | 1/2015 | Swinkels et al. | |
| 2015/0063112 A1* | 3/2015 | Wu | H04L 45/302 370/235 |
| 2015/0124615 A1* | 5/2015 | Spector | H04L 47/22 370/235 |
| 2015/0127805 A1* | 5/2015 | Htay | H04L 43/0876 709/224 |
| 2016/0065422 A1* | 3/2016 | Khargharia | H04L 45/30 370/412 |
| 2016/0112327 A1* | 4/2016 | Morris | H04L 47/127 398/45 |
| 2016/0182329 A1* | 6/2016 | Armolavicius | H04L 45/02 370/230 |
| 2016/0218948 A1* | 7/2016 | Djukic | H04L 43/0876 |
| 2016/0285640 A1* | 9/2016 | Kapur | H04L 12/10 |
| 2016/0301579 A1* | 10/2016 | Djukic | H04L 41/5009 |

* cited by examiner

DYNAMIC BANDWIDTH CONTROL SYSTEMS AND METHODS IN SOFTWARE DEFINED NETWORKING

FIELD OF THE DISCLOSURE

The present disclosure generally relates to networking systems and methods. More particularly, the present disclosure relates to dynamic bandwidth control systems and methods in Software Defined Networking (SDN).

BACKGROUND OF THE DISCLOSURE

Conventional networking includes "static" configuration of services at various layers (e.g., Layer 0—optical, Layer 1—Time Division Multiplexing (TDM), Layer 2—packet, etc.). The optical layer can include circuit-based services, where network resources are dedicated to the circuit-based services. Networking planning efforts are utilized to change lower-layer services based on upper-layer demand, e.g., Layer 0 and/or 1 services changed based on packet demands. Some conventional attempts to automate this control or lower-layer services are accomplished with network resource broker and scheduler tools, but in this scenario, the bandwidth need is determined a priori and does not necessarily reflect actual usage. Conventional packet services are aggregated into circuit-oriented technologies (TDM), such as Optical Transport Network (OTN), where network resources are dedicated to particular connections, no matter the actual usage of the connections. This network paradigm has the following limitations: i) there is a waste of OTN resources when actual packet traffic is below OTN container size, ii) there can be dropping of packet traffic when the mapping is insufficient into the OTN container size, and iii) this leads to single-tiered pricing not based on actual usage of network.

Attempts to provide bandwidth-on-demand (BOD) in packet networks is traditionally accomplished with the use of Excess Information Rates (EIR) rates. If the network does not realize congestion, a user may be able to send extra packet data up to its EIR. However, there is no guarantee of EIR and customers' traffic may be dropped randomly in the case of oversubscription. In packet networking, with the reality of elephant and mouse flows and the realities of the TCP sliding window, inefficient traffic patterns may emerge. Elephant flows are extremely large continuous flows set up by a TCP (or other protocol) flow measured over a network link, and mouse flows are short (in total bytes) flows set up by a TCP (or other protocol) flow measured over a network link. Mouse flow bursts could have a detrimental effect on elephant flows causing throughput back-offs due to TCP sliding window, where if elephant flows had dedicated resources with less change of congestion, the elephant flows could complete faster. And vice-versa, in some circumstances, low-priority elephant flows may slow down the transmission of high-priority mouse flows in an unpredictable way.

Packet networking provides statistical multiplexing capabilities and can enforce Service Layer Agreements (SLAs) through Committed Information Rate (CIR) and EIR. But, in times of congestion, traffic oscillations may cause less-than-desired throughput within the network. Some attempts have been made to provide EIR-like functionality to circuit-based networks. But, these approaches are still somewhat "static" in nature, as they do not continually broker new EIR levels based on realized real-time analysis of the traffic. For example, some approaches in circuit-based networks include re-sizing OTN services in reaction to specific events like failures or over-subscription in new services. However, conventional approaches do not provide dynamic time-dependence.

Regarding packet networking, drawbacks include:
Packet queuing in times of congestion (when EIR traffic is being handled) can cause non-deterministic behavior on traffic flows. For instance, a burst of mouse flow traffic can cause packet loss to elephant flows, thus causing TCP sliding window behavior to impede throughput of the elephant flow;
Lack of tracking ongoing EIR consumption and relation back to a user, for consumption-based pricing models;
Lack of coordination of circuit-based, transport-layer services, so that OTN connections might be sized incorrectly for instantaneous use; and
All-packet solutions are not feasible, i.e., optical transport services are required for metro and core network connectivity. In addition, Layer 1 (e.g., OTN) networks provide cost savings relative to Multiprotocol Label Switching (MPLS) networks.

Regarding OTN networks:
OTN networks are circuit-based. When an Optical channel Data Unit (ODU) is not being used to send traffic, the OTN resources are still active for the ODU and not available for any other connection; and
Proposed attempts to provide flexible ODU connection sizes are only effective at service creation time, and subsequently remain static, no matter their instantaneous utilization.

Conventionally, in over-booking situations, network resources are not allocated by priority according to centralized network-wide logic. Furthermore, the process of prioritization does not have access to outside network information such as user's SLA and business priority in conventional approaches.

Regarding on-demand scheduling, in this model, something needs to notify the network a priori that additional bandwidth is required, and this may not always be a feasible determination.

BRIEF SUMMARY OF THE DISCLOSURE

In an exemplary embodiment, a bandwidth control method implemented in a Software Defined Networking (SDN) network includes obtaining data for one or more services in the network, wherein each of the one or more services is controlled by an associated user-agent; determining future bandwidth requirements for the one or more services based on the data; determining service requests for at least one of the one or more services based on the future bandwidth requirements; and causing implementation of at least one of the service requests. The one or more services can be each an A-Z connection providing connectivity at one or more Layers. The service requests can include changes in bandwidth of one or more of Layer 0 optical connections, Layer 1 Optical Transport Network (OTN) connections responsive to future bandwidth requirements at higher layers, and Layer 2 Committed Information Rate (CIR) and/or Excess Information Rate (EIR). The determining future bandwidth requirements can be performed with a trending engine using statistical regression for each of the one or more services. The statistical regression can utilize a linear formula, providing efficiency and scale in the determining, and the statistical regression can be performed on a rolling buffer of transient data that is repeated in cycles.

The obtained data can be from data acquisition providing Performance Monitoring (PM) data related to one or more Layers in the SDN network, and wherein the data acquisition can include correlating each of the one or more services with associated PM data over cycles. The data acquisition can further include structuring each of the one or more services with the associated PM data to show relationships between network elements in the SDN network, ports of the network elements, links in the SDN network, the one or more services, and associated user-agents for the one or more services. The determining service requests can include determining which of the one or more services have the future bandwidth requirements more or less than a threshold difference based on current capacity and creating a service increase queue and a service decrease queue for any of the one or more services that have differences more or less than the threshold difference. The implementation can include addressing all increase requests in the service increase queue, and if all the increase requests are successful, clearing all decrease requests in the service decrease queue, else implementing at least one of the decrease requests to accommodate any failures in the increase requests.

In another exemplary embodiment, a system communicatively coupled to a Software Defined Networking (SDN) network for bandwidth control therein includes a network interface communicatively coupled to one or more network elements in the SDN network; a processor communicatively coupled to the network interface; and memory storing instructions that, when executed, cause the processor to obtain data for one or more services in the network, wherein each of the one or more services is controlled by an associated user-agent, determine future bandwidth requirements for the one or more services based on the data, determine service requests for at least one of the one or more services based on the future bandwidth requirements, and cause implementation of at least one of the service requests. The one or more services can be each an A-Z connection providing connectivity at one or more Layers. The service requests can include changes in bandwidth of one or more of Layer 0 optical connections, Layer 1 Optical Transport Network (OTN) connections responsive to future bandwidth requirements at higher layers, and Layer 2 Committed Information Rate (CIR) and/or Excess Information Rate (EIR). The future bandwidth requirements can be determined with a trending engine configured to use statistical regression for each of the one or more services.

The statistical regression can utilize a linear formula, providing efficiency and scale in the determining, and the statistical regression can be performed on a rolling buffer of transient data that is repeated in cycles. The obtained data can be from a data acquisition system coupled to the SDN network which provides Performance Monitoring (PM) data related to one or more Layers in the SDN network, and wherein the data acquisition system can be configured to correlate each of the one or more services with associated PM data over cycles. The data acquisition system can be further configured to structure each of the one or more services with the associated PM data to show relationships between network elements in the SDN network, ports of the network elements, links in the SDN network, the one or more services, and associated user-agents for the one or more services. The service requests can be determined based on which of the one or more services have the future bandwidth requirements more or less than a threshold difference based on current capacity to create a service increase queue and a service decrease queue for any of the one or more services that have differences more or less than the threshold difference. The implementation can include addressing all increase requests in the service increase queue, and if all the increase requests are successful, clearing all decrease requests in the service decrease queue, else implementing at least one of the decrease requests to accommodate any failures in the increase requests. The system can be an SDN application communicatively coupled to an SDN controller.

In a further exemplary embodiment, a Software Defined Networking (SDN) network includes a plurality of interconnected network elements, wherein the plurality of interconnected network elements operate one or more services, each service is an A-Z connection in the SDN network providing connectivity at one or more Layers; an SDN controller communicatively coupled to the plurality of interconnected network elements; and a server communicatively coupled to the SDN controller, the server configured to implement one or more SDN applications for data acquisition related to data associated with the one or more services and dynamic bandwidth brokering for the one or more services based on a determination of future bandwidth requirements for the one or more services.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
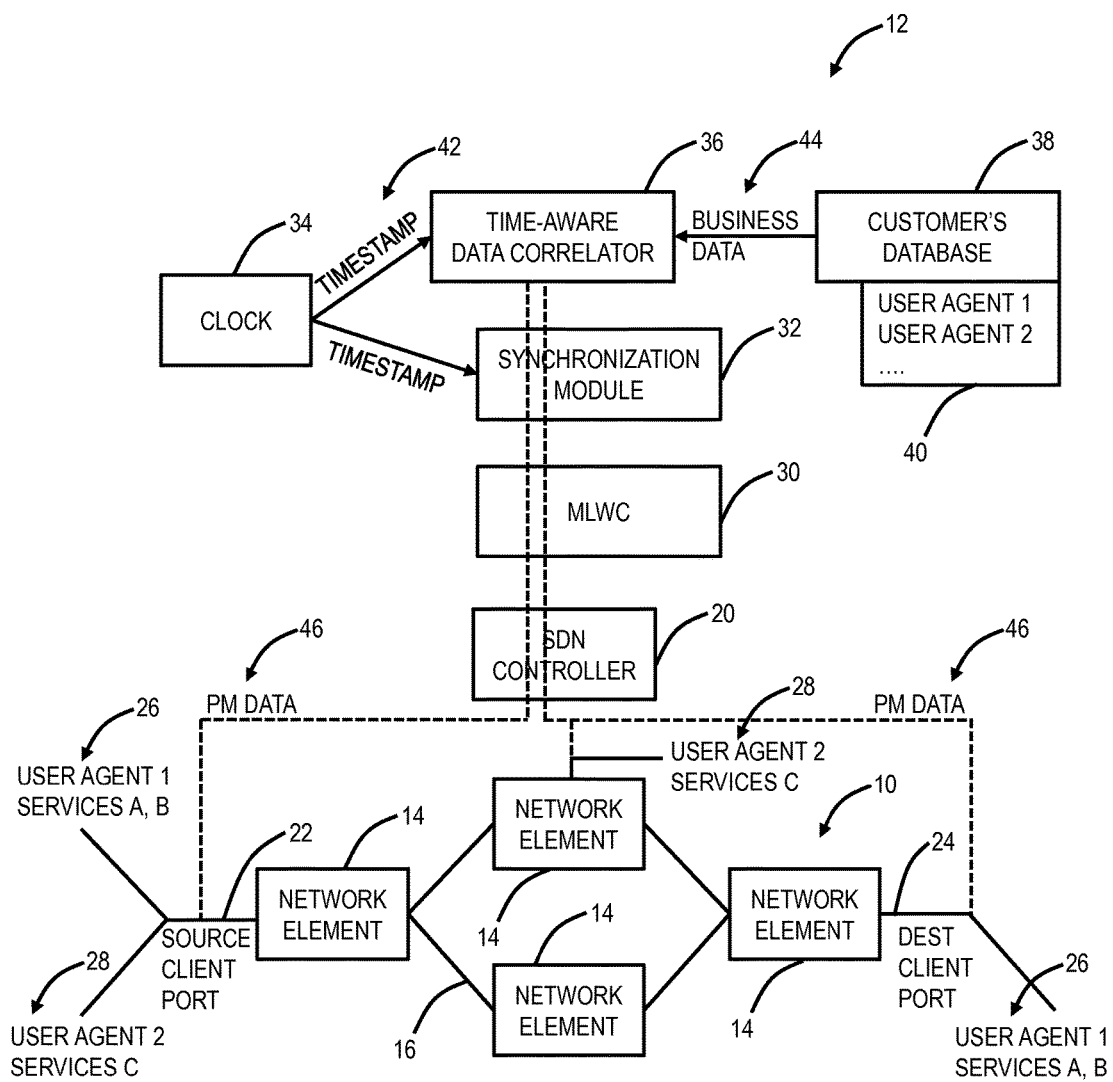
FIG. 1 is a network diagram of a network with a data acquisition system for implementing dynamic bandwidth control systems and methods.

In various exemplary embodiments, the present disclosure relates to dynamic bandwidth control systems and methods in SDN. SDN provides programmable, centralized, multi-layer, and real-time control for a network. By complementing SDN with a Time-aware Data Correlator (TDC) and live data analysis, the dynamic bandwidth control systems and methods enable adjusting underlying resources dynamically to support actual needs of an end-user at any particular time period. The dynamic bandwidth control systems and methods use a service provider's business logic in the prioritization of resource allocation. For instance, a service provider can increase the bandwidth allocated to an especially important customer and decrease the bandwidth allocated to others for a period of time. The dynamic bandwidth control systems and methods include real-time analysis and adjustment of lower-layer resource utilization, as well as at all network layers. The dynamic bandwidth control systems and methods include a Service Broker function which centralizes management and prioritization of network resource allocation. The Service Broker provides an ability to react to overbooking situations with programmable and predictable approaches. The dynamic bandwidth control systems and methods further include a Time-aware Data Correlator's (TDC) which correlates real-time network operations with nearly arbitrary sources of information inside and outside the network. In particular, the TDC can consider a service provider's business logic to prioritize network resources allocation and pricing. Further, a Tending Engine is disclosed which uses statistical regression techniques based on a rolling buffer of transient data to forecast near-term bandwidth demand and feed dynamic bandwidth allocation algorithms (Dynamic Bandwidth Brokering (DBB) or Dynamic bandwidth brokering with Business-aware Priority (DBP)).

As is described herein, the dynamic bandwidth control systems and methods include various aspects. First, user-agents are defined with associated SLAs including CIR, EIR, and EIR priority information. The user-agents are used to track, modify, and control bandwidth allocation for services on A-Z connections in the network, i.e., there can be a user-agent for each service in the network. With the tracking of the user-agents, the dynamic bandwidth control systems and methods can provide variable Layer 0, 1, and/or 2 size modifications using real-time feedback on traffic utilization, through various data acquisition systems described herein. The dynamic bandwidth control systems and methods include "brokering" of resources by priority (per SLA) so that user-agents may obtain lower-layer resources for useful periods of time. The dynamic bandwidth control systems and methods avoid TCP sliding window issues found in traditional packet networks and include historical tracking of user-agent EIR usage, enabling consumption-based billing. The user-agents can be based on Layer 1/OTN connectivity as well as based on ODUFlex or multiple ODU containers, Port-based packet/Ethernet Trail Termination Point (ETTP) user-agent connections, Virtual Local Area Network (VLAN)/Flow-based user-agent connections, and the like.

Data Acquisition System and Process

Referring to FIG. 1, in an exemplary embodiment, a network diagram illustrates a network 10 with a data acquisition system 12 for implementing the dynamic bandwidth control systems and methods. The network 10 includes a plurality of interconnected network elements 14. The network elements 14 can be interconnected via links 16, e.g., wavelengths, TDM connections, packet connections, etc.). In an exemplary embodiment, the network 10 is an SDN network with an associated SDN controller 20 communicatively coupled to one or more of the network elements 14. The network elements 14 can include, without limitation, switches, routers, Packet-Optical Transport Systems (POTS), Optical Add/Drop Multiplexers (OADMs), Reconfigurable OADMs, Multi-Service Provisioning Platforms (MSPPs), etc. that are configured to provide bandwidth connectivity in the network 10 at one or more of Layers 0 (optical), 1 (TDM), 2 (packet), and higher. From a logical perspective, the network elements 14 can each include one or more ports, either User-Network Interface (UNI) ports where client ingress/egress occurs such as a source client port 22 and a destination client port 24 or Network-Network Interface (NNI) ports where the network elements 14 connected to one another over the links 16. In addition to the ports, the network elements 14 can include switching functionality which connects bandwidth between the ports, e.g., optical switching of wavelengths, circuit switching of OTN or other TDM connections, and packet switching with Ethernet, etc.

SDN is an approach to the network 10 where network services, such as services A,B 26 and service C 28, are managed through abstraction of lower-level functionality by decoupling a control plane (which makes decisions about where traffic is sent) from a data plane (which forwards the traffic to the selected destination). For example, OpenFlow is one mechanism for the control plane to communicate with the data plane. The SDN controller 20 is a logically centralized entity, implemented by one or more servers or processors, in charge of (i) translating the requirements from an SDN Application layer down to SDN data paths and (ii) providing the SDN applications with an abstract view of the network (which may include statistics and events). The SDN controller 20 can include one or more Northbound Interface (NBI) agents, SDN Control Logic, and a Control to Data-Plane Interface (CDPI). The SDN controller 20 can include a federation of multiple controllers, a hierarchical connection of controllers, communication interfaces between controllers, virtualization or slicing of network resources, etc. SDN applications are programs that explicitly, directly, and programmatically communicate their network requirements and desired network behavior to the SDN controller 20 via the NBI. In various exemplary embodiments, the data acquisition system 12 and other components for implementing the dynamic bandwidth control systems and methods can include SDN applications. The SDN datapath may encompass all or a subset of the network elements 14 for traffic forwarding and processing in the network 10. The SDN CDPI is the interface defined between the SDN controller 20 and an SDN data path, which provides at least (i) programmatic control of all forwarding operations, (ii) capabilities advertisement, (iii) statistics reporting, and (iv) event notification.

The network 10 can include a Multi-Layer Wide-area Network Controller (MLWC) 30. In an exemplary embodiment, the functionality of the MLWC 30 can be combined in the SDN controller 20. In another exemplary embodiment, the MLWC 30 can be used without the SDN controller 20 in the network 10. In a further exemplary embodiment, the MLWC 30 can be used separately from the SDN controller 20. The dynamic bandwidth control systems and methods dynamically control bandwidth allocation in Layers 0, 1, 2 or higher layer telecommunication networks, based on near real-time demand by individual user-agents 40. For overbooking, the dynamic bandwidth control systems and methods allocate bandwidth by priority, based on a programmable logic that can consider the SLA of each user-agent 40, the resources of the entire network 10, and the service provider's business in general. To achieve this, the dynamic bandwidth control systems and methods rely on the MLWC 30 which is capable of creating/deleting or re-sizing services in a programmable way.

The data acquisition system 12 includes a synchronization module 32, a clock 34, a Time-aware Data Correlator (TDC) 36, and a customer's database 38 with one or more user-agents 40. In operation, the dynamic bandwidth control systems and methods rely on the data acquisition system 12 which is a cyclic Data Acquisition System (DAS) with sufficient time resolution and a data structure in which a timestamp 42 from the clock 34, the requested and delivered bandwidth of each user-agent 40, the network service(s) 26, 28 used to deliver that bandwidth, and the user-agents' business data 44 can be correlated and analyzed simultaneously. Specifically, the network elements 14 are configured to provide Performance Monitoring (PM) data 46, e.g., through the SDN controller 20 or the MLWC 30, to the synchronization module 32 and the TDC 36 is configured to correlate the PM data 46 with the business data 44 associated with the user-agents 40, providing data on a per user-agent 40 basis (i.e., per service 26, 28 basis).

In addition to dynamic bandwidth allocation, the infrastructure of FIG. 1 enables a diversity of applications ranging from early problem detection of the network elements 14 to bandwidth consumption monitoring, SLA-verification, and dynamic pricing. Note, the network 10 is illustrated with the services 26, 28 as examples. The services 26, 28 can include any type of connection in the network 10 such as wavelengths; TDM connections such as ODUn containers (n=0, 1, 2, 3, etc.); ODUflex containers; SONET/SDH containers, etc.; packet connections such as tunnels, paths, etc.; and the like. Also, the services 26, 28 are carried in the network 10 as A-Z connections where each A-Z connection provides bandwidth, at one or more Layers, between two or more network elements 14. Those of ordinary skill in the art will recognize that a practical implementation could include a large number of the services 26, 28 and A-Z connections. An exemplary aspect of the dynamic bandwidth control systems and methods is that each service 26, 28 has a corresponding user-agent 40 associated with it.

For the data acquisition system 12, a Minimal Data Acquisition System (MDAS) requires the MLWC 30, the clock 34, and the TDC 36. A Business aware Data Acquisition System (BDAS) and an A-Z Data Acquisition System (AZDAS) require the synchronization module 32 and the customer's database 38. Finally, a Business-aware A-Z Data Acquisition System (BAZDAS) requires all of the elements in the MDAS and the BDAS or AZDAS. These data acquisition systems are described in additional detail herein.

Figure 2:
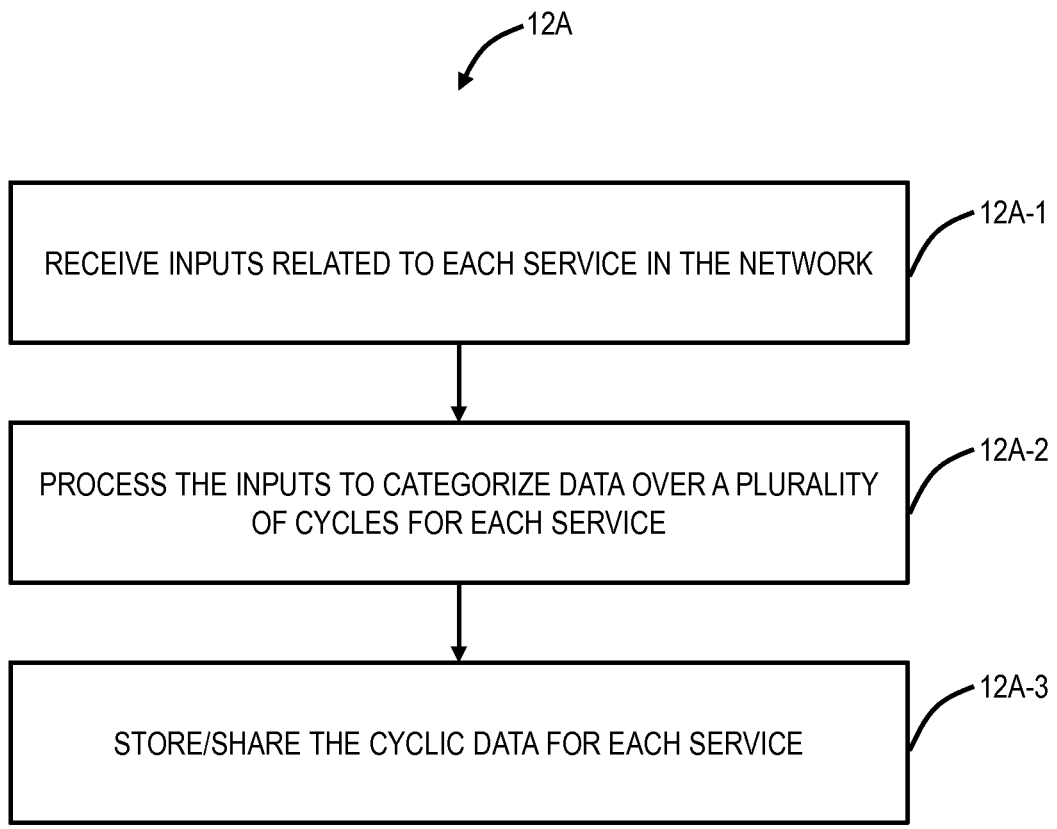
FIG. 2 is a flowchart of a data acquisition process which can be implemented by the data acquisition system in FIG. 1.

Referring to FIG. 2, in an exemplary embodiment, a flowchart illustrates a data acquisition process 12A which can be implemented by the data acquisition system 12. First, in the data acquisition process 12A, inputs are received related to each service 26, 28 in the network 10 (step 12A-1). The inputs can include the PM data 46 or other types of Operations, Administration, and Maintenance (OAM) data associated with the network 10. The PM data 46 includes, without limitation, Ethernet Trail Termination Point (ETTP) Ethernet client port statistics (stats) at Layer 0 and Layer 1, and packet counts or sampled flows (sFlow) at Layer 2 and above. The mapping of the PM data 46 to higher layers is as follows: Ethernet=L2, Internet Protocol=L3, User Datagram Protocol (UDP)/Transmission Control Protocol (TCP)=L4, sFlow=L2+. Specifically, the PM data 46 can include any data collected by the network 10/the network elements 14 that is beneficial in determining bandwidth usage on each of the services 26, 28. In an exemplary embodiment, the MDAS takes as inputs the identity of each service together with Performance Monitoring (PM) data 46 of the services' client ports. For each service 26, 28, the MDAS collects data from only one client port 22, 24, either at the source or the destination. Hence, source-MDAS and destination-MDAS can be defined. For multiple ports, the A-Z Data Acquisition System (AZDAS) is described below.

With the PM data 46 and other inputs, the inputs are processed to categorize data over a plurality of cycles for each service (step 12A-2). The input data is tagged and loaded into a computer memory by the TDC 36 application and the clock 34. The data acquisition process 12A can repeats in cycle, at a frequency ranging, for example, from once per second to once per hour to any other period, approximately, depending on the desired time resolution of the subsequent data analysis. At each cycle, the TDC 36 explicitly correlates each service 26, 28 with its corresponding PM data 46 and timestamp 42. This can be implemented in various ways. For example, a graph data structure can be used with custom software objects to model network elements 14, ports of the network elements 14, the links 16, the services 26, 28, and the user-agents 40, and using pointers to model relationships between these objects. An instance of this data is then recorded for each timestamp 42, providing a coherent snapshot of the entire Graph at this particular moment. And the multiple snapshots can be stored in a Hash Table structure that the TDC 36 exposes with an API to other applications. With such an implementation, the TDC 36 can provide correlated information about any network component at any point in time. Note: if needed, the correlation coefficient r between two network elements x and y over time can be quantified with the conventional formula:

$$r = \frac{\sum xy}{(\sum x^2) \cdot (\sum y^2)}$$

where the sums are performed over multiple timestamps. A number of alternative approaches are also available. Finally, the cyclic data is stored or shared (e.g., via the API) for each service (step 12A-3). The cyclic data is historical bandwidth 62 data which is used in implementing the dynamic bandwidth control systems and methods.

Dynamic Bandwidth Brokering System and Associated Processes

Figure 3:
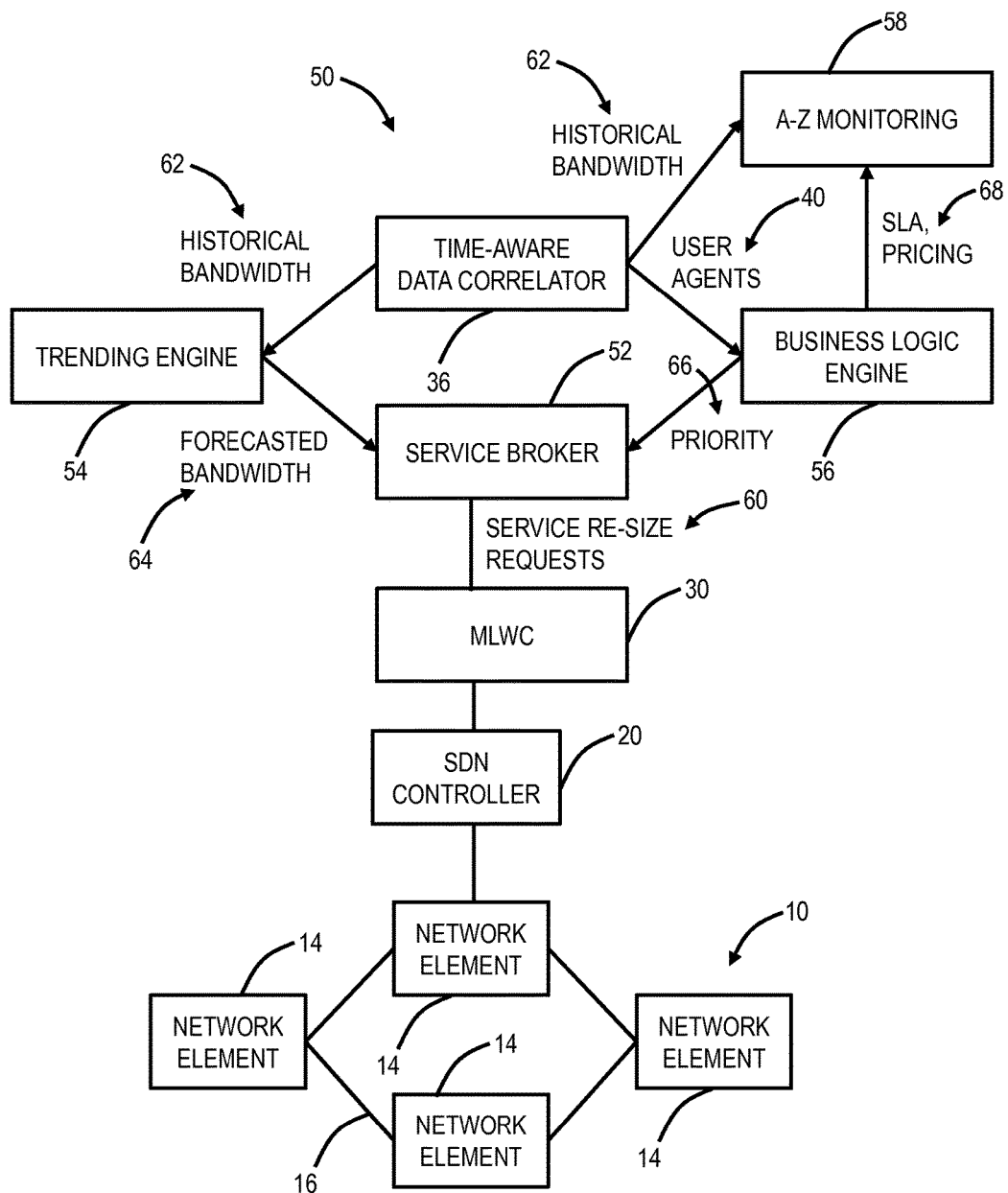
FIG. 3 is a network diagram of the network of FIG. 1 with a dynamic bandwidth brokering system for implementing the dynamic bandwidth control systems and methods.

Referring to FIG. 3, in an exemplary embodiment, a network diagram illustrates the network 10 with a dynamic bandwidth brokering system 50 for implementing the dynamic bandwidth control systems and methods. Similar to the data acquisition system 12, in various exemplary embodiments, the dynamic bandwidth brokering system 50 and other components for implementing the dynamic bandwidth control systems and methods can include SDN applications. The dynamic bandwidth brokering system 50 includes the TDC 36, a service broker 52, a trending engine 54, a business logic engine 56, and A-Z monitoring 58. The dynamic bandwidth brokering system 50 relies on a cyclic data analysis sequence taking inputs from a source-MDAS and potentially sending service create, delete or re-size requests 60 to the MLWC 30 (or SDN controller 20) at each cycle. The core bandwidth allocation process can run in the service broker 52, based on inputs from the trending engine 54.

The dynamic bandwidth brokering system 50 minimally requires the MLWC 30, the TDC 36, the service broker 52, and the trending engine 54. Dynamic bandwidth brokering system with Business-aware Priority (BBP) and monitoring additionally require the business logic engine 56 and the A-Z monitoring 58, respectively. The TDC 36 provides correlated information about user-agents 40, network services 26, 28, and bandwidth usage over time, i.e., historical bandwidth 62. The trending engine 54 provides bandwidth-usage forecasts 64 from the historical bandwidth 62. The service broker 52 centralizes the management and prioritization 66 of network resource allocation. The service re-size requests 60 sent to MLWC 30 (or the SDN controller 20) can be applied to all network layers. Finally, the monitoring applications compare actual bandwidth usage with user-agents' SLA and pricing policies 68.

Figure 4:
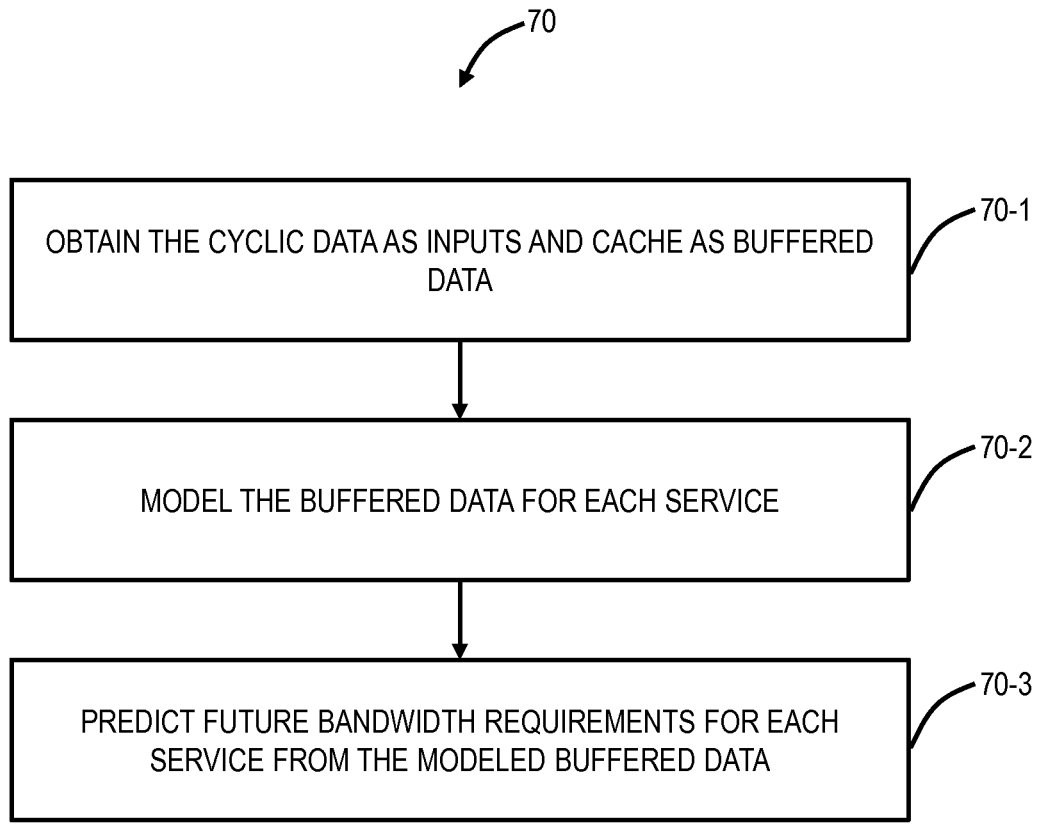
FIG. 4 is a flowchart of a trending process, implemented by the trending engine in FIG. 3.

Referring to FIG. 4, in an exemplary embodiment, a flowchart illustrates a trending process 70, implemented by the trending engine 54. The trending engine 54 obtains the cyclic data as inputs, from the TDC 36, and caches a sub-set of the inputs as buffered data (step 70-1). For example, the buffered data can be in a rolling buffer of transient memory. The buffered data is modeled for each service 26, 28, i.e., each A-Z connection (step 70-2), and the future bandwidth requirements for each service 26, 28 are predicted from the modeled buffered data (step 70-3). This buffered data is used by the trending engine 54 to predict the bandwidth requests of each user-agent 40 in the short-term future, which can be achieved with a variety of techniques.

Figure 5:
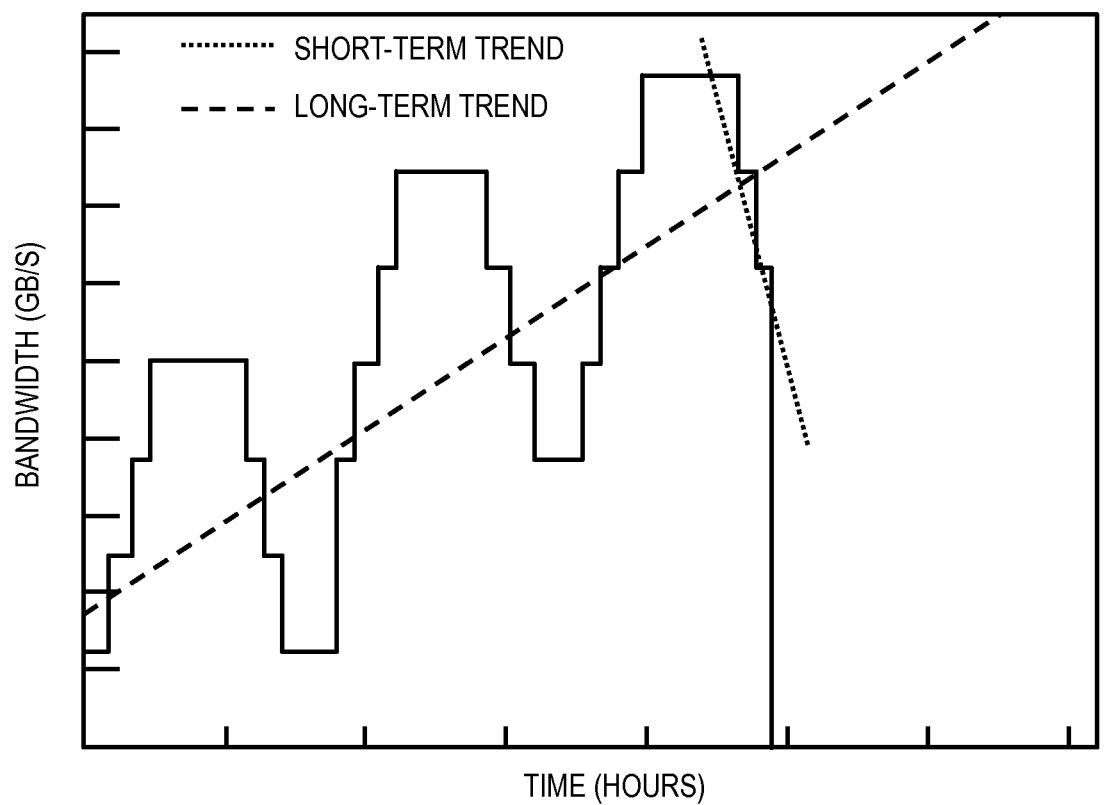
FIG. 5 is a graph of an example of short-term and long-term predictions of bandwidth usage using the trending engine of the dynamic bandwidth brokering system in FIG. 3.

For instance, the buffered data can be modeled as a list of one-dimensional histograms, one histogram per A-Z connection, with time on the x-axis and bandwidth usage at the source client port 22 on the y-axis. For each histogram, a statistical regression can be performed using a linear mathematical formula of the form: $y=mx+b$, where x represents time, y represents bandwidth and m and b are free parameters adjusted to best match the data by the regression procedure. This can be achieved with a number of software libraries, for instance using the Minuit package in ROOT (see root.cern.ch/root/html/TMinuit.html). When the regression has converged, the resulting formula can be used to extrapolate further along the x-axis, as illustrated in FIG. 5. Specifically, FIG. 5 is a graph of an example of short-term and long-term predictions of bandwidth usage using the trending engine 54. The short-term trend could be used to perform Dynamic Bandwidth Brokering. For example, the short-term trend is determined from the past two hours and used to predict the bandwidth demand in the next hour.

Thus, with the process 70, the trending engine 54 provides results which are a prediction of the foreseen bandwidth usage on a given A-Z connection, i.e., forecasted bandwidth for each A-Z connection. Again, as described herein, the A-Z connections provide connectivity for the services 26, 28 in the network 10. In an exemplary implementation, using a simple linear formula (as opposed to more complex formulas) was shown to provide predictions of sufficient accuracy and to ensure that regressions remain fast and robust, as well as scale to an arbitrarily larger number of A-Z connections by processing each element of the histogram list in parallel. The linear formula can provide statistical regression performed on a rolling buffer of transient data that is repeated in cycles. If the cycles have a high frequency, this can provide near real-time adjustments.

Figure 6:
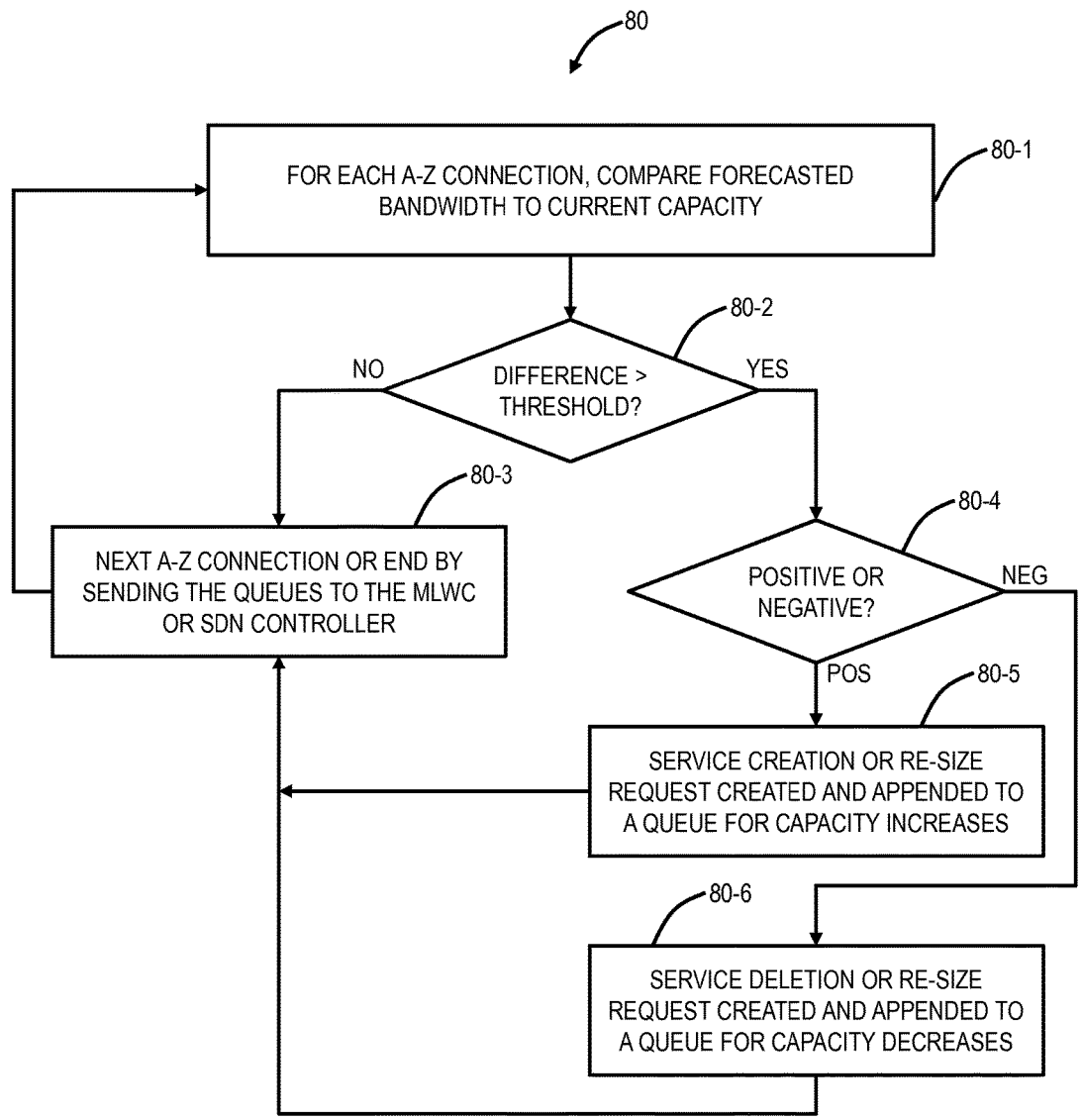
FIG. 6 is a flowchart of a service broker process, implemented by the service broker in FIG. 3.

Referring to FIG. 6, in an exemplary embodiment, a flowchart illustrates a service broker process 80, implemented by the service broker 52. For each A-Z connection, the service broker 52 compares the forecasted bandwidth need (provided by the trending engine 54) with the current capacity of the service(s) 26, 28 covering this connection (step 80-1). The difference between the forecasted bandwidth and the current capacity is checked against a threshold (step 80-2), and if the difference is less than or equal to the threshold, the service broker process 80 goes to the next A-Z connection or ends if all A-Z connections have been considered (step 80-3). If the difference exceeds the threshold (step 80-2), it is determined whether the difference is positive (the A-Z connection is forecasted to need more bandwidth) or negative (the A-Z connection is forecasted to need less bandwidth (step 80-4).

If the difference is positive (step 80-4), appropriate service creation (or re-size) request(s) 60 can be appended to a priority-queue dedicated to capacity increases (step 80-5). On the contrary, if the difference between the forecasted need and the current capacity goes negative below a certain threshold (step 80-6), an appropriate service deletion (or re-size) requests 60 can be appended to a priority-queue dedicated to capacity decreases (step 80-6). The relative priority of each service modification request is set according to a centralized and programmable logic, which is a key aspect. When all A-Z connections have been analyzed, the service broker 52 proceeds with sending capacity-increase requests to the MLWC 30 (or the SDN controller 20) (step 80-3).

Figure 7:
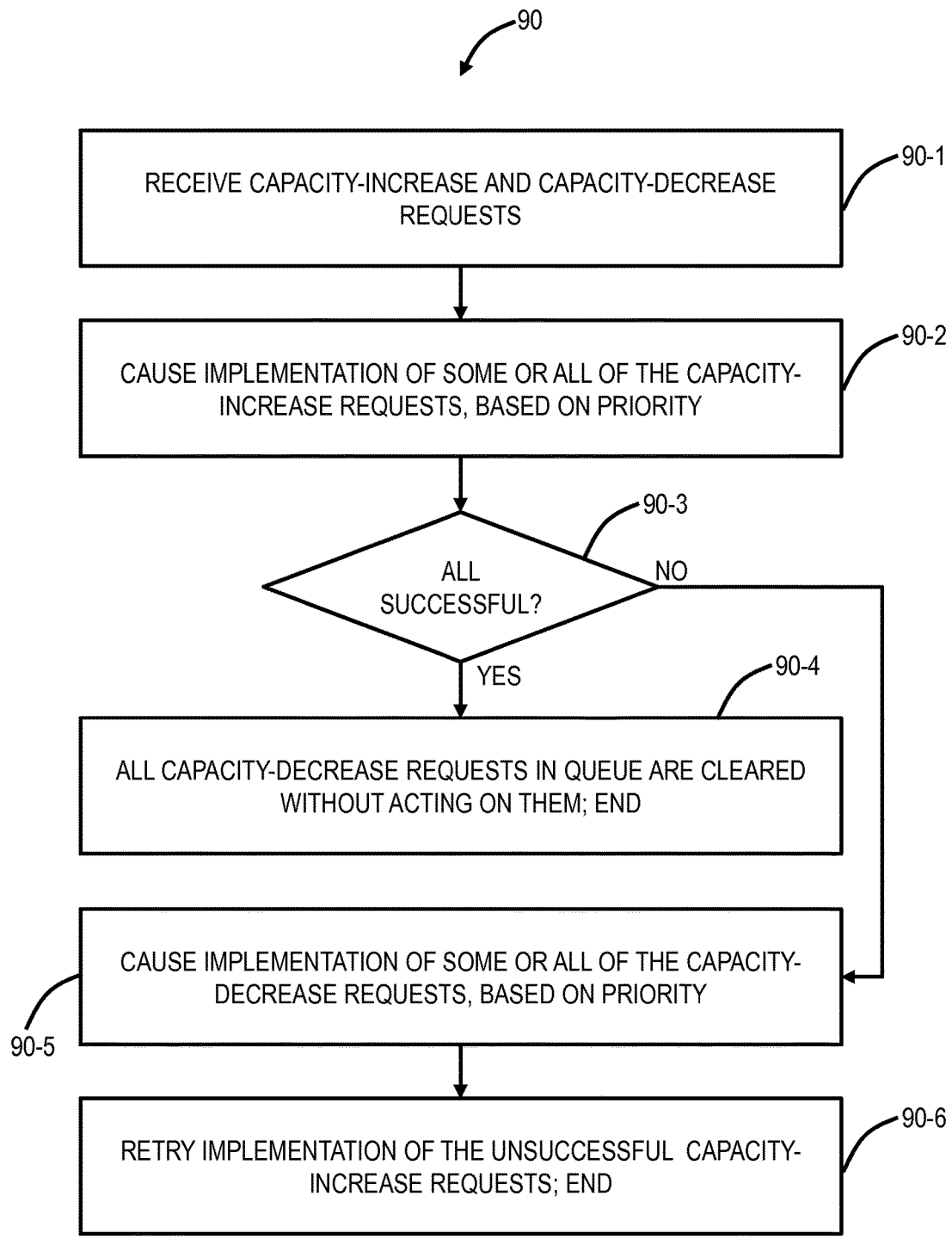
FIG. 7 is a flowchart of a controller process, implemented by the MLWC or the SDN controller in FIG. 3.

Referring to FIG. 7, in an exemplary embodiment, a flowchart illustrates a controller process 90, implemented by the MLWC 30 or the SDN controller 20. The capacity increase requests 60 and the capacity decrease requests 60 are received (step 90-1). Here, the MLWC 30 or the SDN controller 20 can be provided the queues from the service broker process 80, and the MLWC 30 or the SDN controller 20 will either accept or reject each request 60. First, the MLWC 30 or the SDN controller 20 will cause implementation of some or all of the capacity increase requests 60, based on priority (step 90-2). If all the capacity increase requests 60 are successful (step 90-3), there is no need to disturb the network 10 with capacity decrease requests 60 and the capacity decrease queue is cleared without sending its tasks and the process 90 ends (step 90-4). Here, the network 10 has enough bandwidth to support all of the capacity-increase requests 60, so there is no need to free up bandwidth with the capacity decrease requests 60.

However, if a service increase request 60 fails because of lack of network resources (90-3), the reaction includes processing the service decrease queue, which frees-up new available resources. Specifically, the MLWC 30 or the SDN controller 20 will cause implementation of some or all of the capacity decrease requests 60, based on priority (step 90-5). After downsizing all relevant services, the formerly rejected service-increase request 60 can be retried, which is now more likely to be successful (step 90-6). If that re-tried request fails again, the service broker 52 stops trying and proceeds with the next request. The sequence ends when all the capacity increase requests 60 have been processed.

Several technologies can be used to increase or decrease the capacity of an A-Z connection with the MLWC 30 or the SDN controller 20. At Layer 2, the increase or decrease is achieved by adjusting the CIR and EIR of relevant services. At Layer 1, the increase or decrease is most easily achieved with the ODUflex technology if the appropriate equipment is available. But the MLWC 30 or the SDN controller 20 enables capacity increases or decreases without ODUflex, such as by regrouping multiple services together with an ODU0 granularity or the like. At Layer 0, the increase or decrease is achieved by lighting additional wavelengths, changing modulation format, spectral density, baud rate, etc. The dynamic bandwidth allocation sequence can repeat in cycle, at a programmable frequency that can range from seconds to hours, depending on the usage pattern, the frequency of the data acquisition system 12 and the responsiveness of the MLWC 30 and of the underlying network elements 14.

Business-Aware Data Acquisition System (BDAS)

The BDAS is an extension of the MDAS. In addition to all the MDAS components, the BDAS collects business data about the user-agents 40 in the network 10, possibly taking inputs from a service provider's customer database 38. As for MDAS, a source-BDAS and destination-BDAS can be defined for data collection of the services' client port 22, 24, either at source or at destination. In the BDAS, the TDC 36 data structure explicitly correlates each service 26, 28 with its corresponding PM data 46, timestamp 42, and user-agent's business data 44.

Dynamic Bandwidth Brokering with Business-Aware Priority (DBP)

The Dynamic bandwidth brokering system with Business-aware Priority (DBP) is an extension of the dynamic bandwidth brokering processes described above in which the service broker 52 considers additional inputs from a Business Logic Engine (BLE), which requires a the BDAS. The BLE gets inputs from the TDC 36 to determine various items such as the SLA, the pricing policy 68, or the relative importance of each user-agent 40 in the network 10.

At the service broker 52 level, the DBP process is identical to the dynamic bandwidth brokering processes (the processes 70, 80, 90) except for two aspects. Firstly, the service broker process 80 loops over plain A-Z connections while the DBP process loops over (A-Z connection, user-agent) doublets. Hence, if an A-Z connection C is internally composed of several services associated with either user-agent U or user-agent U', the DBP process will consider the doublets (C,U) and (C,U') independently and the trending engine 54 (TE) will provide independent forecasted bandwidth predictions for each doublet. As a result, the trending accuracy is typically improved in the DBP process since the a priori different, and uncorrelated usage patterns of U and U' are estimated with different formulas.

Secondly, once all the service capacity increase and decrease requests 60 have been determined, the DBP process can set their relative priorities according to a logic that consider business inputs from the BLE as well. As a result, the DBP process enables features like giving higher priority to user-agents 40 in danger of not fulfilling their SLA or to customers of highest strategic importance for the service provider, which is a crucial advantage over DBB. Apart from these two differences, the end of the bandwidth allocation sequence is identical in DBP and DBB.

A-Z Data Acquisition System (AZDAS)

The AZDAS is an extension of the MDAS in which the PM data 46 of client ports 22, 24 is collected both at source and at destination. Hence, the AZDAS covers both extremities of each A-Z connection (and hence its name). In addition to all the MDAS components, the AZDAS includes the synchronization module 32 to ensure that the timings of the source and destination ports 22, 24 remain consistent at all times. The synchronization module 32 periodically measures the amount of time required to travel from the source port 22 to the destination port 24 of each service 26, 28, and applies an offset correction to the destination port timestamp 42. This time offset is taken into account in the TDC 36 data structure correlating each service with the PM data 46 of its client ports 22, 24 (at source and destination).

Business-Aware A-Z Data Acquisition System (BAZDAS).

The BAZDAS is essentially a combination of the AZDAS and the BDAS, i.e., an extension of the MDAS with additional business data 44 about user-agents 40 and PM data 46 about source and destination ports 22, 24. The BAZDAS also includes the synchronization module 32, identically to AZDAS.

A-Z Monitoring Applications

A series of A-Z monitoring applications can take advantage of the AZDAS or BAZDAS inputs to monitor network data and make useful interpretations, without necessarily interfering with the network operations:

Bandwidth usage visualization to show live bandwidth utilization across the network 10 such as with histograms updating at each data acquisition cycle;

Data loss detection to compare data flows at the source and destination ports 22, 24 to monitor losses along the service path, using the AZDAS;

SLA verification to compare data flows at destination ports 24 with user-agent's SLA 68, using the BAZDAS or the destination-BDAS; and Pricing to price user-agents 40 according to their actual consumed bandwidth, using the destination-BDAS.

By complementing these A-Z monitoring applications with the TDC 36 and feedback loops performing live data analysis, the dynamic bandwidth control systems and methods enable the adjusting of underlying network resources dynamically to support actual needs of an end-user at any particular time period.

Figure 8:
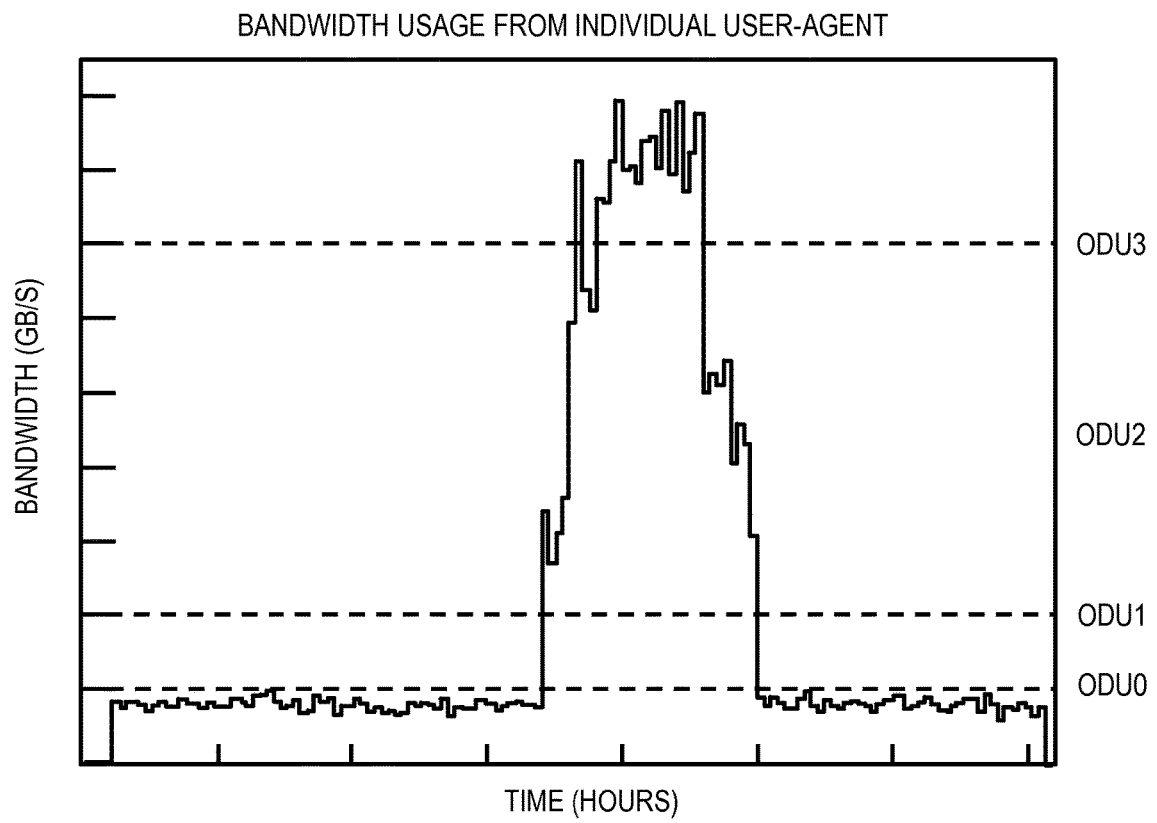
FIG. 8 is a graph of a use case for dynamic bandwidth allocation by a single user-agent owning an A-Z connection.

For example, consider the following user-agent 40 the illustrated in a graph in FIG. 8 which is a use case for dynamic bandwidth allocation by a single user-agent owning an A-Z connection. For most time periods, the user-agent utilizes less than 1.25 Gbps of traffic, which maps nicely into an ODU0 connection. The user-agent 40 may occasionally need (substantially) more network bandwidth. In this case, the user-agent 40 requires up to around 12 Gbps of bandwidth. In this case, the user may be given an SLA where CIR=1.25 Gbps and EIR=12 Gbps for a Peak Information Rate of (PIR)=13.25 Gbps.

Figure 9:
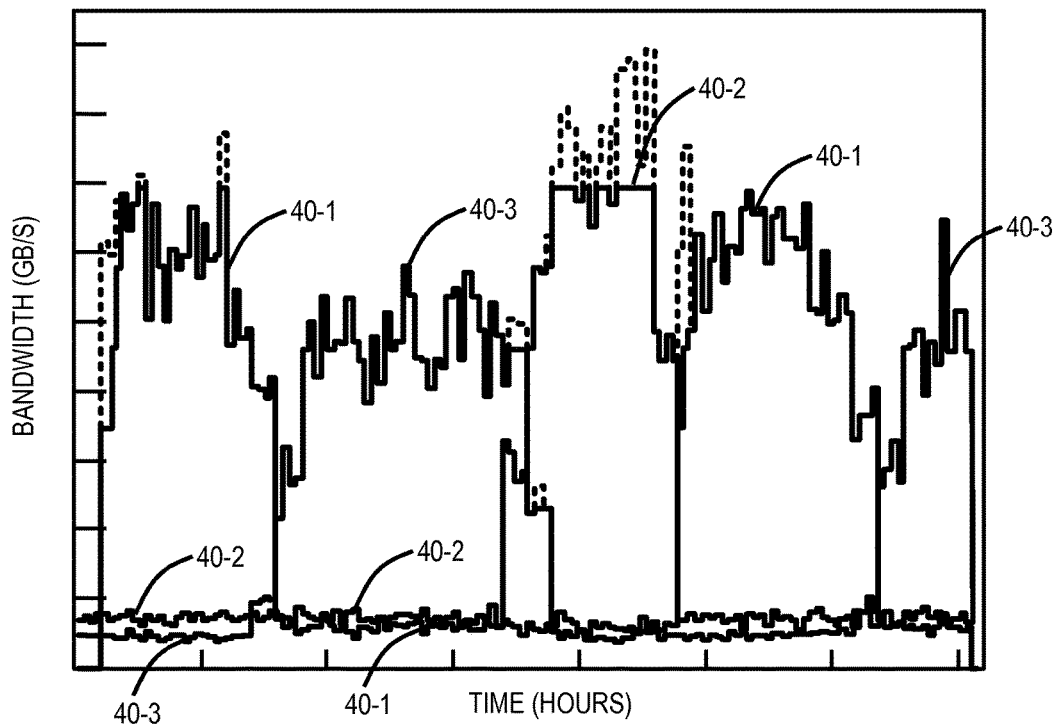
FIG. 9 is graphs of shared usage of an Optical Channel Transport Unit-2 (OTU2) link by three independent user-agents with dynamic bandwidth brokering (top) and with static bandwidth allocation (bottom)
Figure 9:
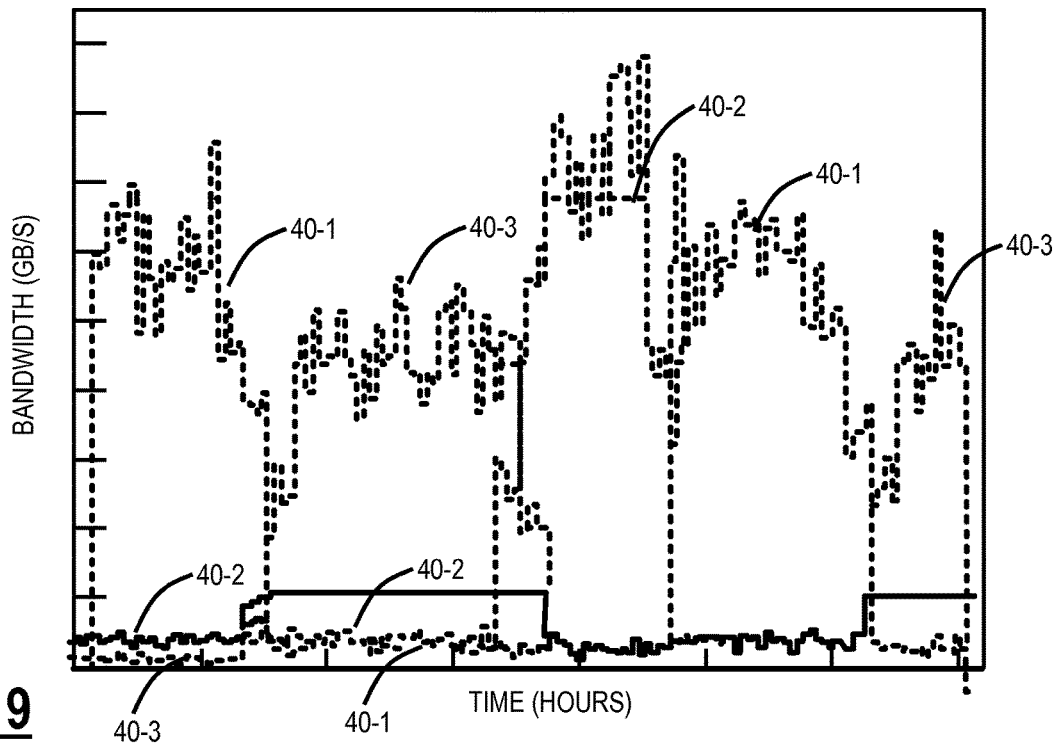

Referring to FIG. 9, in an exemplary embodiment, graphs illustrate shared usage of an Optical Channel Transport Unit-2 (OTU2) link by three independent user-agents 40-1, 40-2, 40-3 with dynamic bandwidth brokering (top) and with static bandwidth allocation (bottom). Note, the dynamic bandwidth brokering utilizes the various techniques described herein whereas the static bandwidth allocation does not. Note, the three independent user-agents 40-1, 40-2, 40-3 have different times where each peaks. The dotted lines correspond to requested bandwidth, but not delivered, and the solid lines correspond to delivered bandwidth.

If the user-agent in FIG. 8 is provided a dedicated ODU2 container to provide 10 Gbps of bandwidth in order to support the PIR more closely, the other user-agents may be denied bandwidth, as seen in FIG. 9 (bottom). On the other hand, FIG. 9 (top) shows a better solution where all the user-agents 40-1, 40-2, 40-3 are provided a CIR for their typical amount of bandwidth utilization. Then, as their bandwidth peaks toward PIR, their OTN container sizes are modified to account for the increase in traffic. In this scenario, all user-agents 40-1, 40-2, 40-3 have the ability to realize their PIR at some time; there is not a global maximum PIR due to an aggregate of user SLAs.

Operation of the Dynamic Bandwidth Brokering System

Figure 10:
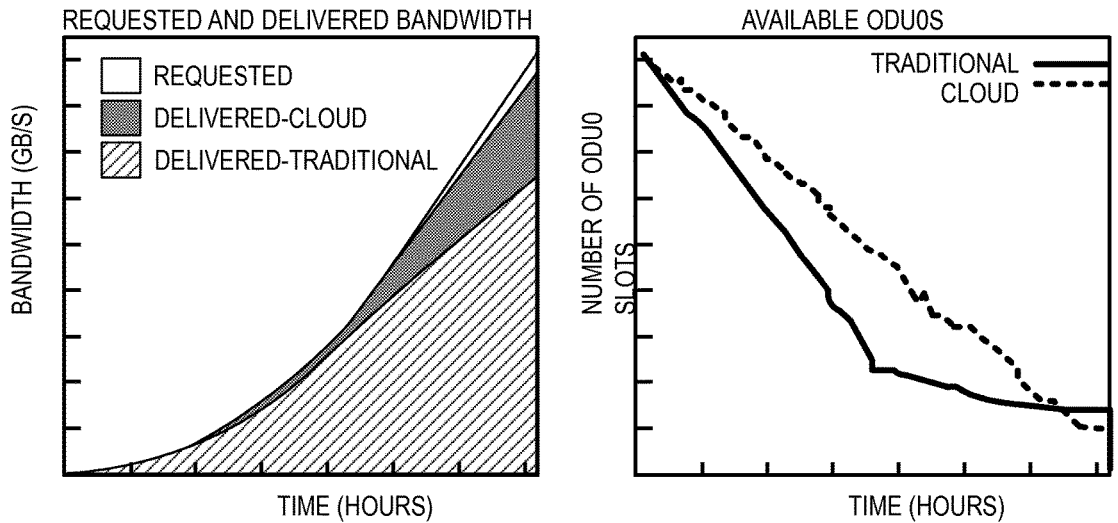
FIGS. 10-12 are graphs of the dynamic bandwidth control systems and methods described herein operated in an actual network environment.
Figure 11:
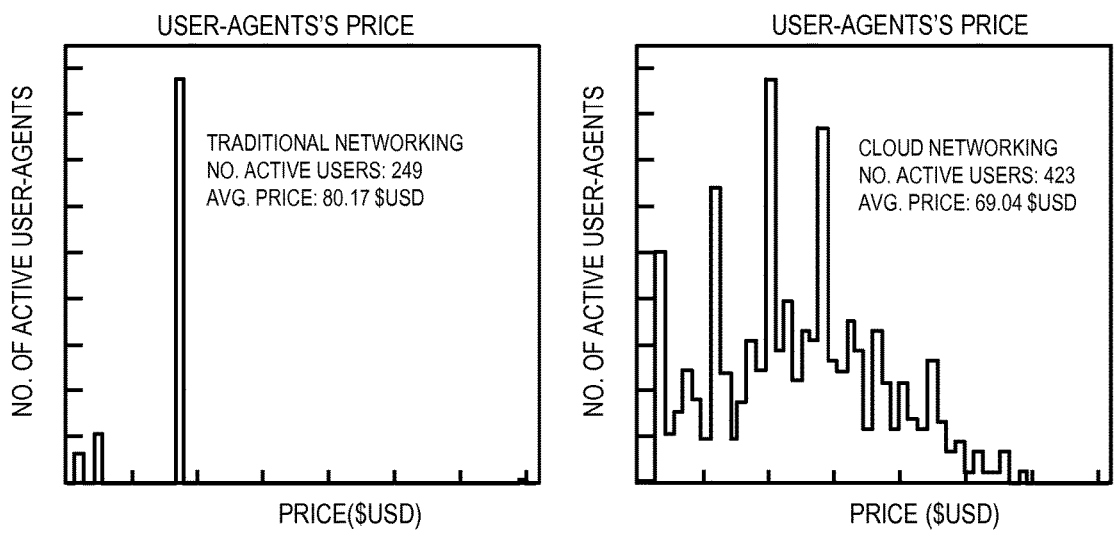
Figure 12:
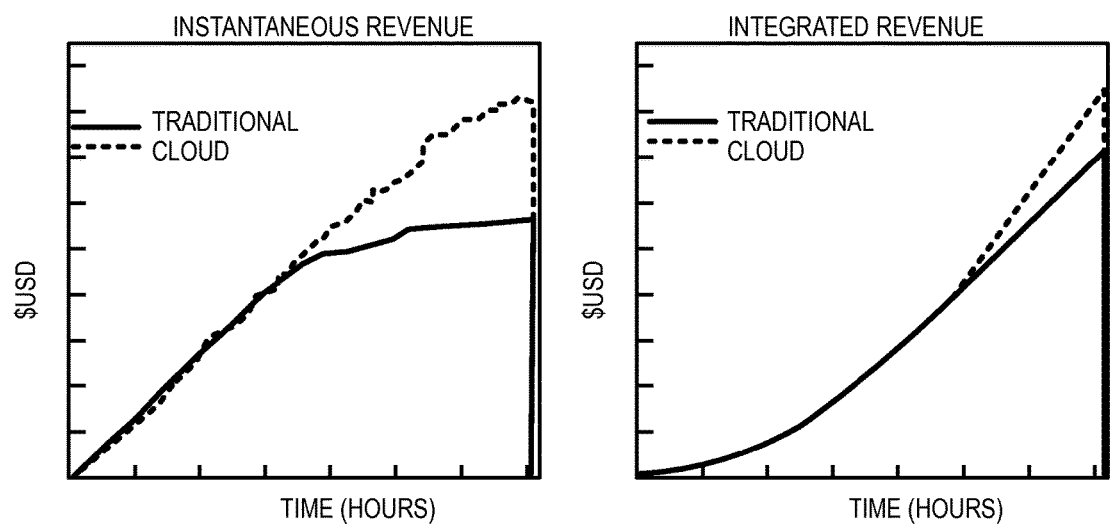

Referring to FIGS. 10-12, in exemplary embodiments, graph illustrate the dynamic bandwidth control systems and methods described herein operated in an actual network environment. Specifically, FIGS. 10-12 are results for a simulation that mimics the network topology and usage patterns of the large metropolitan area, based on actual customer's data. To obtain these results, new randomized user-agents were added at each time bin while a server was running the DBP process, with a caveat that the forecasted bandwidth need is effectively perfect and not determined with a trending engine of imperfect accuracy. In addition, a simplified form of dynamic pricing was prototyped in this simulation. In the static case, user-agents 40 were priced 1 cent per Gbps per second for the full capacity of their allocated bandwidth, irrespective of their actual usage. In the dynamic case, user-agents 40 were priced 2 cents per Gbps per second, but only for the bandwidth that they actually consumed. Note, when viewed from the user-agent in FIG. 8, this deal would be very advantageous for the customers of a service provider.

In FIG. 10, the left graph is requested and delivered bandwidth on a simulated network with static ("traditional") versus dynamic ("cloud") bandwidth allocation. The right graph is a total number of available resources (ODU0 units) in the simulated network when user-agents are adding new services over time. As shown in the right graph, cloud networking (with the DBP process) maximizes the global network capacity. The network throughput is significantly increased by the use of dynamic bandwidth brokering ("cloud") compared to static bandwidth allocation ("traditional"), and increasingly so as the network fills up and the available resources decrease.

In FIG. 11, the price paid by simulated user-agents of a simulated network with static bandwidth are shown in the left graph ("traditional", left) and with dynamic bandwidth in the right graph ("cloud", right). Dynamic bandwidth is lower cost for customers, on average, but enables more customers and revenue for the service provider. User-agents get lower cost bandwidth on average in the dynamic case (69.04$) than the static case (80.17$). However, many more user-agents can be accommodated in the dynamic case (423) compared to the static case (249). As a result, as seen in FIG. 12, service providers can generate more revenues with dynamic bandwidth brokering, especially when the network fills up, and the available resources decrease (similarly to FIG. 10).

SDN Environment

Figure 13:
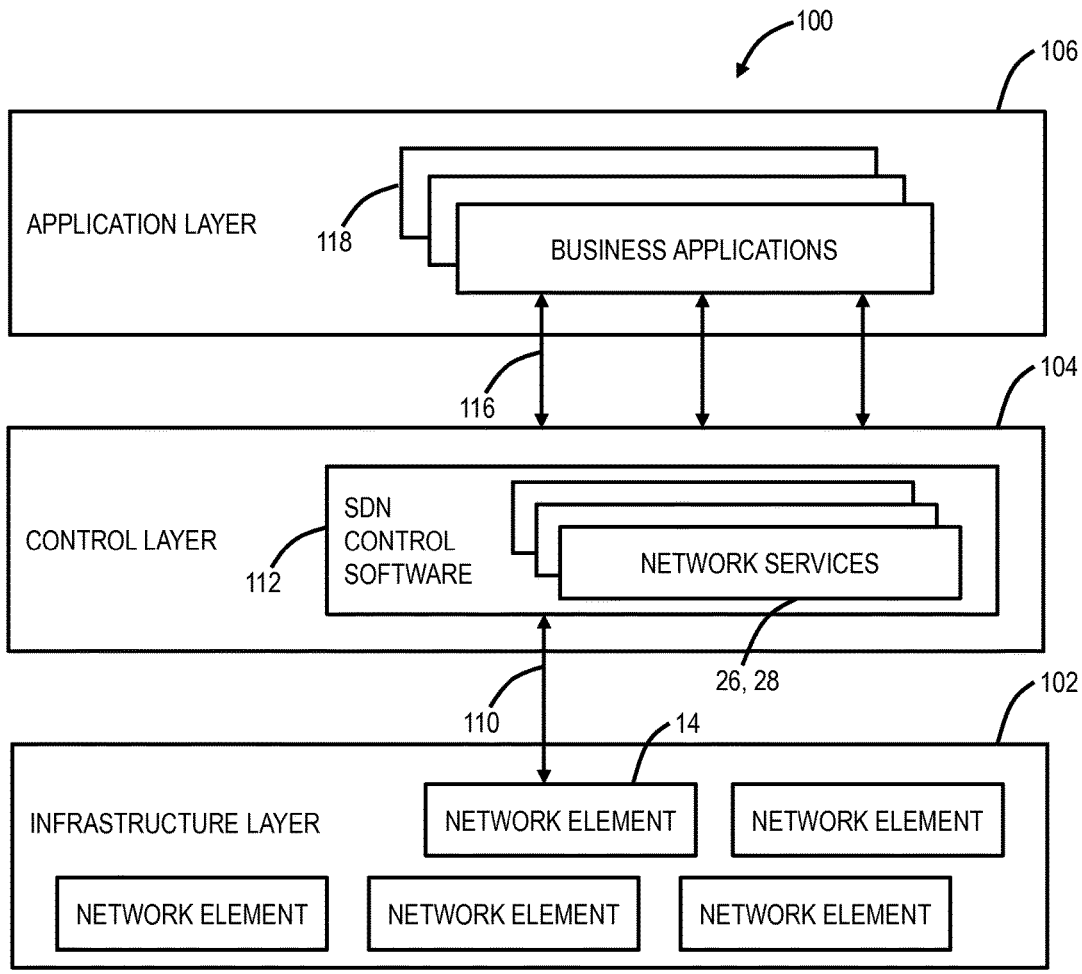
FIG. 13 is a block diagram of functional/logical components of an SDN environment, for implementing the dynamic bandwidth control systems and methods.

Referring to FIG. 13, in an exemplary embodiment, a block diagram illustrates functional/logical components of an SDN environment 100, for implementing the dynamic bandwidth control systems and methods. The SDN environment 100 includes a programmable infrastructure layer 102, a control layer 104, and an application layer 106. The programmable infrastructure layer 102 includes network devices such as the network elements 14, and other components in the network 10 and is communicatively coupled to the control layer 104 via a control plane interface 110 such as OpenFlow, for example, or any other SDN protocol. The control layer 104 facilitates communication between the application layer 106 and the network elements 14 located in the programmable infrastructure layer 102. The control layer 104 includes SDN control software 112 which control a plurality of network services 26, 28. The control layer 104 provides SDN functionality to manage network services through the abstraction of lower level functionality. For example, the SDN control plane can be implemented in full or in part through the control layer 104. The application layer 106 communicates with the control layer 104 through various Application Programming Interfaces (APIs) 116. The application layer 106 provides end user connectivity to the SDN such as software modules and/or functions responsible for creating desired path and flow connections on the physical network through various business applications 118. In various exemplary embodiments, components in the network 10, the data acquisition system 12, and the dynamic bandwidth brokering system 50 can be implemented in the control layer 104, in the application layer 106, as one of the business applications 118, etc. For example, components in the data acquisition system 12 and the dynamic bandwidth brokering system 50 can be one or more of the business applications 118. The user-agents 40 can be controlled and managed through a business application 118, etc.

Exemplary Server

Figure 14:
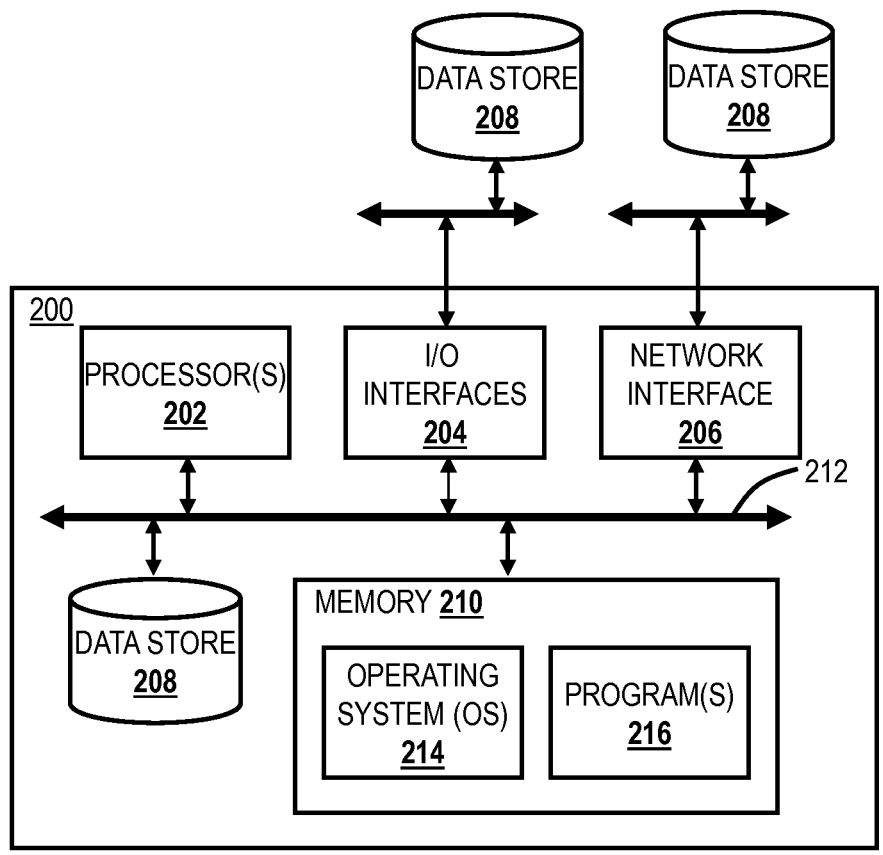
FIG. 14 is a block diagram of a server for the implementing various components of the data acquisition system in FIG. 1, the SDN controller in FIGS. 1 and 3, the dynamic bandwidth brokering system in FIG. 3, and the SDN environment in FIG. 13, and the various processes described herein.

Referring to FIG. 14, in an exemplary embodiment, a block diagram illustrates a server 200 such as for the implementing various components of the the data acquisition system 12, the SDN controller 20, the dynamic bandwidth brokering system 50, and the SDN environment 100, and the various processes described herein. The server 200 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 14 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the components above.

The processor 202 is a hardware device for executing software instructions. The processor 202 can be any custom made or commercially available processor, a central processing unit (CPU), graphics processing units (GPUs), an auxiliary processor among several processors associated with the server 200, a semiconductor based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 200 to communicate on a network. The network interface 206 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 200 such as, for example, an internal hard drive connected to the local interface 212 in the server 200. Additionally in another embodiment, the data store 208 can be located external to the server 200 such as, for example, an external hard drive connected to the I/O interfaces 204 (e.g., SCSI or USB connection). In a further embodiment, the data store 208 can be connected to the server 200 through a network, such as, for example, a network-attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The data acquisition system 12, the SDN controller 20, the dynamic bandwidth brokering system 50, and the SDN environment 100 can be physically realized through one or more of the servers 200. For example, these components can be realized in an individual server 200, a federation of servers 200, a hierarchical connection of servers 200, distributed servers 200, or virtualization of the server 200. The server 200 can form the SDN controller 20 or the MLWC 30. Another server 200 or the same server 200 can host the business applications 118, providing, e.g., the MLWC 30, the synchronization module 32, the TDC 36, the customer's database 38, the service broker 52, the trending engine 54, the BLE 56, etc.

It will be appreciated that some exemplary embodiments described herein may include one or more generic or specialized processors ("one or more processors") such as microprocessors, digital signal processors, GPUs, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby and are intended to be covered by the following claims.

What is claimed is:
1. A bandwidth control method implemented in a Software Defined Networking (SDN) network, the bandwidth control method comprising:
  obtaining data for one or more services in the network, wherein each of the one or more services is controlled, modified, and tracked at a plurality of layers in the network by an associated user-agent implemented through an SDN application, wherein each of the one or more services has an associated user-agent with associated Service Layer Agreement (SLA) information;
  determining future bandwidth requirements for the one or more services based on the associated user-agents tracking the data and associated business data for each of the one or more services, wherein the associated business data is obtained from a customer database associated with a service provider, and wherein the future bandwidth requirements are determined for a respective service through the associated user-agent by tracking buffered data for bandwidth of the associated service and utilizing a trending engine using statistical regression to determine the future bandwidth requirements;
  determining service requests to modify at least one of the one or more services based on the future bandwidth requirements; and
  causing implementation of at least one of the service requests.

2. The bandwidth control method of claim 1, wherein the one or more services are each an A-Z connection providing connectivity at the plurality of layers.

3. The bandwidth control method of claim 1, wherein the service requests comprise changes in bandwidth of one or more of Layer 0 optical connections, Layer 1 Optical Transport Network (OTN) connections responsive to future bandwidth requirements at higher layers, and Layer 2 Committed Information Rate (CIR) and/or Excess Information Rate (EIR).

4. The bandwidth control method of claim 1, wherein the statistical regression utilizes a linear formula, providing efficiency and scale in the determining of future bandwidth requirements, and wherein the statistical regression is performed on a rolling buffer of transient data that is repeated in cycles.

5. The bandwidth control method of claim 1, wherein the obtained data is from data acquisition providing Performance Monitoring (PM) data related to one or more Layers in the SDN network, and wherein the data acquisition comprises correlating each of the one or more services with associated PM data over one or more cycles.

6. The bandwidth control method of claim 5, wherein the data acquisition further comprises structuring each of the one or more services with the associated PM data to show relationships between network elements in the SDN network, ports of the network elements, links in the SDN network, the one or more services, and the associated user-agents for the one or more services.

7. The bandwidth control method of claim 1, wherein the determining service requests comprises determining which of the one or more services have the future bandwidth requirements more or less than a threshold difference based on current capacity and creating a service increase queue and a service decrease queue for any of the one or more services that have differences more or less than the threshold difference.

8. The bandwidth control method of claim 7, wherein the implementation comprises addressing all increase requests in the service increase queue, and if all the increase requests are successful, clearing all decrease requests in the service decrease queue, else implementing at least one of the decrease requests to accommodate any failures in the increase requests.

9. A system communicatively coupled to a Software Defined Networking (SDN) network for bandwidth control therein, the system comprising:
  a network interface communicatively coupled to one or more network elements in the SDN network;
  a processor communicatively coupled to the network interface; and
  memory storing instructions that, when executed, cause the processor to
    obtain data for one or more services in the network, wherein each of the one or more services is controlled, modified, and tracked at a plurality of layers in the network by an associated user-agent implemented through an SDN application, wherein each of the one or more services has an associated user-agent with associated Service Layer Agreement (SLA) information,
    determine future bandwidth requirements for the one or more services based on the associated user-agents tracking the data and associated business data for each of the one or more services, wherein the associated business data is obtained from a customer database associated with a service provider, and wherein the future bandwidth requirements are determined for a respective service through the associated user-agent by tracking buffered data for bandwidth of the associated service and utilizing a trending engine using statistical regression to determine the future bandwidth requirements,
    determine service requests to modify at least one of the one or more services based on the future bandwidth requirements, and
    cause implementation of at least one of the service requests.

10. The system of claim 9, wherein the one or more services are each an A-Z connection providing connectivity at the plurality of layers.

11. The system of claim 9, wherein the service requests comprise changes in bandwidth of one or more of Layer 0 optical connections, Layer 1 Optical Transport Network (OTN) connections responsive to future bandwidth requirements at higher layers, and Layer 2 Committed Information Rate (CIR) and/or Excess Information Rate (EIR).

12. The system of claim 9, wherein the statistical regression utilizes a linear formula, providing efficiency and scale in the determining of future bandwidth requirements, and wherein the statistical regression is performed on a rolling buffer of transient data that is repeated in cycles.

13. The system of claim 9, wherein the obtained data is from a data acquisition system coupled to the SDN network which provides Performance Monitoring (PM) data related to one or more Layers in the SDN network, and wherein the data acquisition system is configured to correlate each of the one or more services with associated PM data over one or more cycles.

14. The system of claim 13, wherein the data acquisition system is further configured to structure each of the one or more services with the associated PM data to show relationships between network elements in the SDN network, ports of the network elements, links in the SDN network, the one or more services, and the associated user-agents for the one or more services.

15. The system of claim 9, wherein the service requests are determined based on which of the one or more services have the future bandwidth requirements more or less than a threshold difference based on current capacity to create a service increase queue and a service decrease queue for any of the one or more services that have differences more or less than the threshold difference.

16. The system of claim 15, wherein the implementation comprises addressing all increase requests in the service increase queue, and if all the increase requests are successful, clearing all decrease requests in the service decrease queue, else implementing at least one of the decrease requests to accommodate any failures in the increase requests.

17. A Software Defined Networking (SDN) network, comprising:
  a plurality of interconnected network elements, wherein the plurality of interconnected network elements operate one or more services, each service is an A-Z connection in the SDN network providing connectivity at a plurality of layers in the SDN network;
  an SDN controller communicatively coupled to the plurality of interconnected network elements; and
  a server communicatively coupled to the SDN controller, the server configured to implement one or more SDN applications for data acquisition related to data associated with the one or more services and dynamic bandwidth brokering for the one or more services based on a determination of future bandwidth requirements for the one or more services, wherein each of the one or more services has an associated user-agent with associated Service Layer Agreement (SLA) information, wherein the one or more services are each controlled, modified, and tracked at a plurality of layers in the network by an associated user-agent implemented through the one or more SDN applications, and wherein the dynamic bandwidth brokering is based on a determination of future bandwidth requirements for the one or more services based on the associated user-agents tracking the data and associated business data for each of the one or more services, and a service request is implemented for at least one service of the one or more services to modify the at least one service based on the associated future bandwidth requirements, wherein the associated business data is obtained from a customer database associated with a service provider, and wherein the future bandwidth requirements are determined for a respective service through the associated user-agent by tracking buffered data for bandwidth of the associated service and utilizing a trending engine using statistical regression to determine the future bandwidth requirements.

\* \* \* \* \*